March 25, 1947.  E. A. SCHWARTZ  2,417,951
METHOD OF OPERATING OPEN HEARTH FURNACES
Filed July 22, 1942  2 Sheets-Sheet 1
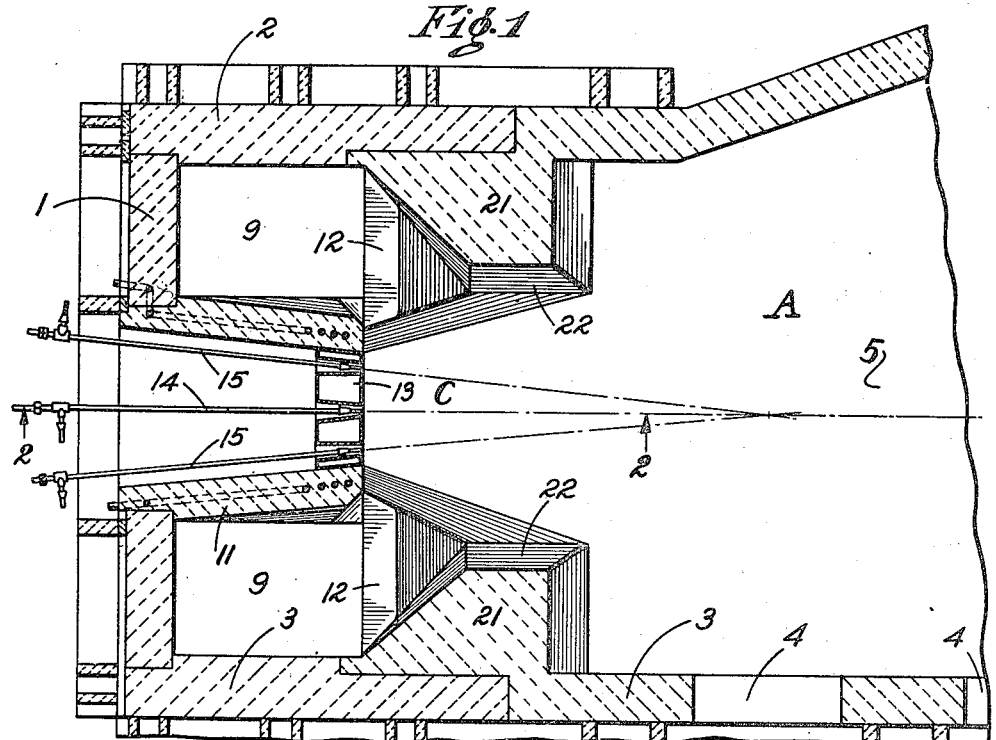
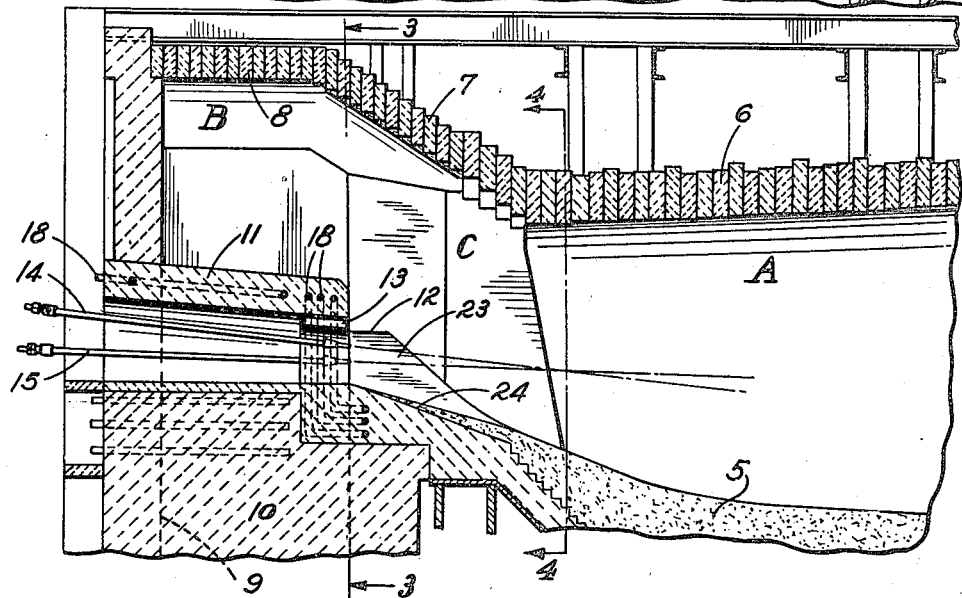
INVENTOR.
ELMER A. SCHWARTZ
BY
*Richey & Watts*
ATTORNEYS March 25, 1947. E. A. SCHWARTZ 2,417,951
METHOD OF OPERATING OPEN HEARTH FURNACES
Filed July 22, 1942 2 Sheets-Sheet 2

INVENTOR.
ELMER A. SCHWARTZ
BY
Richey & Watts
ATTORNEYS

Patented Mar. 25, 1947

2,417,951

UNITED STATES PATENT OFFICE 2,417,951

METHOD OF OPERATING OPEN-HEARTH FURNACES

Elmer A. Schwartz, Shaker Heights, Ohio, assignor to Republic Steel Corporation, Cleveland, Ohio, a corporation of New Jersey Application July 22, 1942, Serial No. 451,903

7 Claims. (Cl. 75—43)

1

This invention relates generally to the open hearth furnace art and is more particularly concerned with a new and improved method of heating charges in an open hearth furnace.

Many efforts have been made heretofore to decrease the time required to make a heat of steel in an open hearth furnace, but, so far as I am aware, none of these efforts has been entirely satisfactory.

I have discovered that the time required to make a heat of steel can be decreased by more than 10% by the present invention which includes the steps of creating what might be called secondary mixing of fuel and air in the melting chamber of the furnace while keeping the flame down close to the charge during the melting down period. The secondary mixing is brought about by directing streams of fuel from a plurality of burners along converging lines so that the flames cause a high degree of turbulence with resultant agitation of the air and by bringing fresh air into such contact with the flames that the oxygen of the air will promote combustion of the fuel at an increased rate and to an increased extent. The flames are kept close to the charge by directing one flame down onto the charge while directing other flames horizontally over the first flame at its place of impingement on the charge. As a result of this combination of steps the fuel burns more or less completely in one end of the furnace and gives up much of its heat by conduction directly to the charge, and the gases give up increased amounts of their heat to the furnace brickwork and charge by convection before leaving the melting chamber. Thus the charge absorbs more heat from the fuel and does it more rapidly than was possible heretofore, and the melting rate is considerably increased.

In the drawings accompanying and forming a part of this specification,

Figure 1 is a fragmentary, horizontal, sectional view taken at the top of the bridge walls of an oil-fired hearth furnace constructed in accordance with the present invention;

Figure 2 is a fragmentary, vertical, central, sectional view taken on line 2—2 of Fig. 1;

Figure 3:
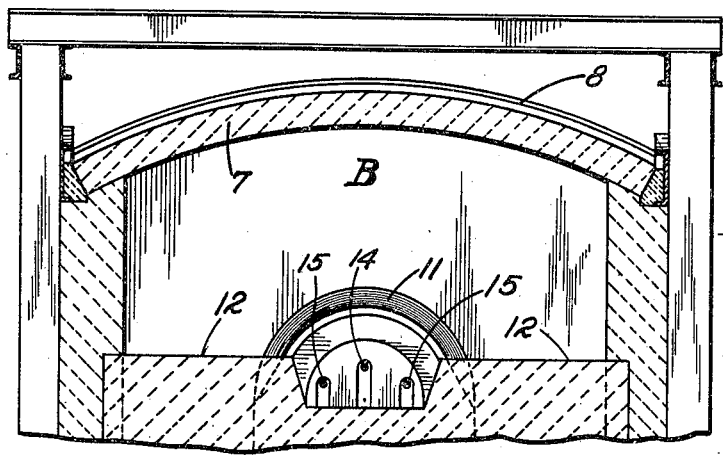
Figure 4:
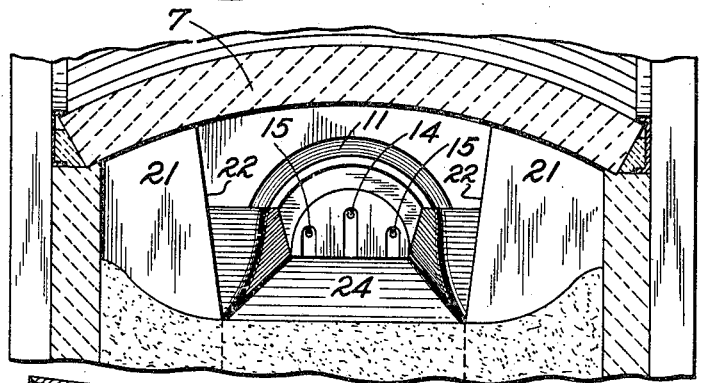
Figure 5:
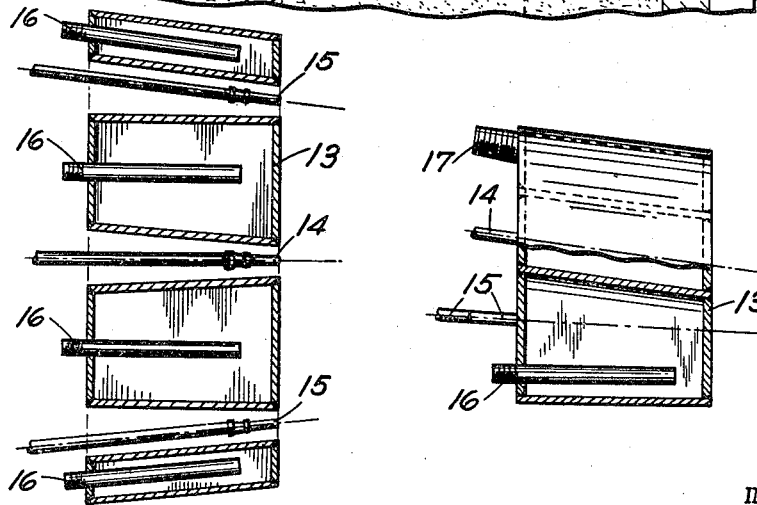
Figure 6:
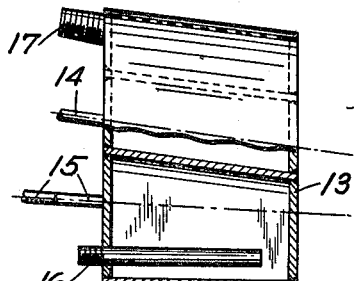

Figures 3 and 4 are transverse, sectional views taken on lines 3—3 and 4—4 respectively of Fig. 2;

Figure 5 is an enlargement of the water cooled burner port shown on Fig. 1; and, Figure 6 is a side elevational view, partly in section of the port of Fig. 5.

Figs. 1 to 4 inclusive show part of an open hearth furnace. Since the remaining part of the furnace is substantially a duplicate of the parts shown in these figures, a description of the parts illustrated will suffice for similar but not shown parts. This furnace comprises an end wall 1, rear side wall 2, front side wall 3 provided with charging ports 4, a hearth 5, a roof consisting of an arch portions 6 over the hearth, an inclined portion 7 over the mixing chamber, and a horizontal section 8 above the flues 9. These vertical flues 9 are defined, as indicated, by vertical end wall 1, side walls 2 and 3, walls 10 on which the hood 11 is supported and bridge walls 12. The hood 11 is composed of side walls and a roof which preferably converge inwardly from end wall 1, and is hollow, open at its outer end and provided with a water cooled burner port 13 at its inner end.

This port 13, as is better shown in Figs. 5 and 6, is a hollow metal frame provided with a plurality of openings therethru into which burners 14 and 15 project, and with a plurality of inlet compartments to which water is admitted thru pipes 16, and a common outlet compartment from which water may escape thru pipe 17. Cooling water pipes 18 are embedded in the walls of the hood for cooling the nose of the hood particularly.

The bridge walls 12 which extend from hood 11 toward the furnace side walls have their top surfaces at a level somewhat above the level of the burners. These bridge walls 12 merge into the monkey walls 21 which extend inwardly from each of the side walls and in part define a mixing chamber C. These walls 21 extend from the hearth 5 to the roof 7, as is better shown in Figs. 2 and 4, and their opposed surfaces 22 and roof 7 define the passage thru which air and fuel enter the mixing chamber C. Surfaces 23 slope upwardly steeply from apron 24 to the top of the bridge walls 12.

It will be noted that the upper ends of the flues or air passages 9 open into a chamber B extending over the hood 11; that this chamber B communicates with the mixing chamber C thru the passage between walls 21, and that air passing from chamber B to chamber C is forced downwardly by roof 7 and inwardly by the rear surfaces of walls 21 so that the air flows down over the forward end of hood 11 and along surfaces 23 and apron 24. The cross-sectional shape of the air stream passing from mixing chamber C into melting chamber A is substantially defined by apron 24, surfaces 22 and the lower surface of wall 7. This end construction of the furnace insures that the air stream will substantially surround the flames of the fuel discharged from the burners 14 and 15.

The position and arrangement of the burners 14 and 15 is important. As the drawings illustrate, the main burner 14 is positioned to discharge liquid fuel under pressure parallel to and preferably along the longitudinal center line of the furnace toward the melting chamber A. The burner 14 is inclined so that it will project the fuel downwardly on a line intersecting the surface of a charge in the melting chamber near the end thereof adjacent to the burner. The auxiliary burners 15 are positioned to deliver fuel under pressure along lines which are located a short distance above the top surface of the charge in the melting chamber and which converge and preferably intersect in the melting chamber some little distance beyond the place where the line of the main burner intersects with the substantially horizontal plane of the auxiliary burners. Preferably the burners 15 direct fuel along substantially horizontal lines. The lines of the fuel projected from the auxiliary burners 15 lie adjacent to opposite sides of the line of projection of fuel from the main burner 14 at the place where the latter passes below the substantially horizontal plane of the former.

It will be noted that all the burners are positioned some little distance above the apron 24 and that the incoming air may surround the fuel projected from the burners from about the time the fuel leaves the burners until it has passed into the melting chamber A. The air which initially surrounds the fuel as it emerges from the burners mixes with the fuel and affords oxygen for burning some of the fuel. The projection of fuel from the several burners along the lines described above results in a secondary mixing of air and fuel, i. e., subsequent to the mixing which takes place in the mixing chamber. This secondary mixing, most of which takes place in the melting chamber, is the result of the turbulence caused by the direction and location of the flames produced by the burning of the several streams of fuel. Where the flame from the burner 14 passes below and between the flames from the auxiliary burners 15, much turbulence is caused which has the effect of agitating the air and bringing fresh parts thereof into contact with the unburned fuel, thereby promoting further and rapid combustion of the fuel. Similarly, farther on in the melting chamber where the flames from the auxiliary burners tend to converge and intersect much turbulence, with corresponding agitation of the air takes place, and expedites further and more complete combustion of the fuel.

The flame from the main burner tends to impinge on the charge in the melting chamber and, in the area of impingement, gives up heat to the charge by conduction. The flames from the auxiliary burners tend to blanket the flame from the main burner for some distance beyond its place of impingement on the charge and thus in effect tends to hold the main burner flame down onto, or in contact with, the charge for some additional time, thereby increasing the amount of heat transferred by conduction to the charge.

I believe that by reason of such secondary mixings the fuel is burned quicker and more completely than has been possible heretofore with resultant liberation of much of the heat of the fuel shortly after it enters the melting chamber, and that thereby more opportunity is allowed for extraction of heat from the products of combustion before they leave the melting chamber than was possible heretofore. I also believe that by tending to hold the main burner flame down onto or close to the charge for a prolonged time more heat is transferred by conduction to the charge than has been possible heretofore, and that such increased transfer by conduction results in more rapid and complete absorption of the heat by the charge.

Actual use of the foregoing process has demonstrated that the melting rate of a charge may be increased considerably over prior practice, as much as one and one-half hours being saved in the melting down period which normally requires from about 4½ to 5 hours for the same size heat. Since the soaking time, that is the time the charge is in molten condition, remains substantially unchanged, it follows that the total time required for making a heat of open hearth steel by this invention may be shortened to the extent of 1½ hours or over 10%.

It will be understood that the auxiliary burners 15 may be used or not, as desired, after the charge has been melted down.

Altho the present invention has been described in some detail hereinabove in conjunction with the use of liquid fuel, it will be understood by those skilled in the art that the process may be carried out by the use of gaseous fuel by the substitution of suitable gas burners for the liquid fuel burners 14 and 15.

Having thus described my invention so that others skilled in the art may be able to understand and practice the same, I state that what I desire to secure by Letters Patent is defined in what is claimed.

What is claimed is:

1. The method of making steel in the melting chamber of an open hearth furnace which includes the steps of projecting streams of fluid fuel under pressure from a plurality of burners into one end of and longitudinally of, said chamber, flowing into said chamber a stream of air which substantially encircles said streams of fuel, directing one of said streams of fuel down onto the adjacent end of a steel making charge in said chamber and directing another of said streams of fuel in a substantially horizontal plane convergingly toward the first said stream and above the place of impingement of the first said stream on said charge.

2. The method of making steel in a melting chamber of an open hearth furnace which includes the steps of projecting streams of fuel under pressure from a plurality of burners into one end of and longitudinally of, said chamber, flowing into said chamber a stream of air which substantially encircles said streams of fuel, projecting the fuel from one of said burners along a downwardly extending line intersecting the adjacent end of a steel making charge in said chamber, and projecting fuel from another of said burners along a substantially horizontal line extending past and closely adjacent to the first said line.

3. The method of making steel in the melting chamber of an open hearth furnace which includes the steps of projecting streams of fluid fuel under pressure from a plurality of burners into one end of and longitudinally of, said chamber, flowing into said chamber a stream of air which substantially encircles and initially mixes with said streams of fuel, and creating secondary mixing of said fuel and air in said chamber by directing the fuel from one burner downwardly along a line intersecting the adjacent end of a steel making charge in said chamber and converging in turbulence-creating proximity to another of said streams of fuel, which stream is in a substantially horizontal plane.

4. The method of making steel in the melting chamber of an open hearth furnace which includes the steps of projecting streams of fluid fuel under pressure from a plurality of burners into one end of and longitudinally of, said chamber, flowing into said chamber a stream of air which substantially encircles and initially mixes with said streams of fuel, and creating secondary mixing of said fuel and air in said chamber by directing fuel from one burner downwardly along a line intersecting the adjacent end of a steel making charge in said chamber and between and in turbulence-creating proximity to converging, substantially horizontal streams of fuel from two other burners.

5. The method of making steel in the melting chamber of an open hearth furnace which includes the steps of projecting streams of fluid fuel under pressure from a plurality of burners into one end of and longitudinally of, said chamber, flowing into said chamber a stream of air which substantially encircles said streams of fuel, projecting fuel from one of said burners along a downwardly extending line intersecting the adjacent end of a steel making charge in said chamber and projecting fuel from burners on opposite sides of the first said burner along substantially horizontal lines which are adjacent to said downwardly extending line and which intersect the latter in said chamber.

6. The method of making steel in the melting chamber of an open hearth furnace which includes the steps of projecting streams of fluid under pressure from a plurality of burners into one end of and longitudinally of, said chamber, flowing into said chamber a stream of air which substantially encircles said streams of fuel and mingles with the latter, and creating secondary mixing of said air with said fuel streams in said chamber by directing the fuel from two of said burners along substantially horizontal lines which intersect over a steel making charge in the adjacent end of said chamber and directing a stream of fuel from another of said burners along a downwardly extending line between and in proximity to said converging lines and intersecting the surface of the charge beneath said converging lines of fuel.

7. The method of making steel in the melting chamber of an open hearth furnace which includes the steps of projecting streams of fuel from a plurality of burners into one end of and longitudinally of, said chamber, flowing into said chamber a stream of air which substantially encircles said streams of fuel and mixes with the burning fuel of said streams, and creating secondary mixing of said air and fuel in said chamber by directing one stream of said fuel downwardly along a line which intersects the adjacent end of a steel making charge in the chamber and directing streams of fuel in a substantially horizontal plane on opposite sides of the first said stream along lines which intersect in said chamber after passing beyond the first said line.

ELMER A. SCHWARTZ.

REFERENCES CITED

The following references are of record in the file of this patent:

UNITED STATES PATENTS

| Number | Name | Date |
|---|---|---|
| 1,904,128 | Fuller | Apr. 18, 1933 |
| 871,071 | Schwartz | Nov. 12, 1907 |
| 2,172,105 | Parker | Sept. 5, 1937 |
| 1,867,221 | Hepburn | July 12, 1932 |
| 2,149,980 | Paret | Mar. 7, 1939 |
| 1,513,828 | Kernohan | Nov. 4, 1924 |
| 2,021,245 | Tonnar | Nov. 19, 1935 |
| 1,572,902 | Egler | Feb. 16, 1926 |
| 2,362,085 | Morgan | Nov. 7, 1944 |